United States Patent [19]
Griswold et al.

[11] Patent Number: 6,077,611
[45] Date of Patent: Jun. 20, 2000

[54] PRINTABLE PAPER RELEASE COMPOSITIONS

[75] Inventors: Roy M. Griswold, Ballston Spa; Melania I. Lapinski, Malta; Michael J. O'Brien, Clifton Park, all of N.Y.

[73] Assignee: General Electric Company, Pittsfield, Mass.

[21] Appl. No.: 08/940,586

[22] Filed: Sep. 30, 1997

[51] Int. Cl.$^7$ ..................................................... B32B 27/40
[52] U.S. Cl. .................. 428/423.3; 428/352; 428/423.5; 428/423.7; 428/424.2; 428/424.8; 428/425.1; 428/425.5; 428/451; 428/452; 524/501; 524/588; 524/591; 524/837; 524/839; 524/840; 525/474
[58] Field of Search ...................................... 524/501, 588, 524/591, 837, 839, 840; 428/41.4, 41.8, 352, 423.3, 423.5, 423.7, 424.2, 424.8, 425.1, 425.5, 451, 452; 525/474

[56] References Cited

U.S. PATENT DOCUMENTS

| | | | |
|---|---|---|---|
| 3,159,601 | 12/1964 | Ashby | 528/15 |
| 3,159,662 | 12/1964 | Ashby | 528/15 |
| 3,344,111 | 9/1967 | Chalk | 528/15 |
| 3,418,731 | 12/1968 | Anclaux | 36/30 R |
| 3,419,593 | 12/1968 | Willing | 556/479 |
| 3,445,420 | 5/1969 | Kookootsedes et al. | 524/862 |
| 3,461,185 | 8/1969 | Brown | 525/478 |
| 3,715,334 | 2/1973 | Karstedt | 528/15 |
| 3,775,452 | 11/1973 | Karstedt | 556/10 |
| 3,814,730 | 6/1974 | Karstedt | 528/15 |
| 3,882,083 | 5/1975 | Berger et al. | 528/15 |
| 3,989,667 | 11/1976 | Lee et al. | 525/478 |
| 4,043,977 | 8/1977 | deMontigny et al. | 528/15 |
| 4,057,596 | 11/1977 | Takamizawa et al. | 525/475 |
| 4,061,609 | 12/1977 | Bobear | 524/703 |
| 4,256,870 | 3/1981 | Eckberg | 528/15 |
| 4,337,332 | 6/1982 | Melancon et al. | 528/15 |
| 4,347,346 | 8/1982 | Eckberg | 528/15 |
| 4,386,135 | 5/1983 | Campbell et al. | 428/447 |
| 4,448,815 | 5/1984 | Grenoble et al. | 427/387 |
| 4,465,818 | 8/1984 | Shirahata et al. | 528/12 |
| 4,472,563 | 9/1984 | Chandra et al. | 528/15 |
| 4,476,166 | 10/1984 | Eckberg | 427/387 |
| 4,533,575 | 8/1985 | Melancon | 427/387 |
| 4,562,096 | 12/1985 | Lo et al. | 427/208.8 |
| 4,772,515 | 9/1988 | Hara et al. | 428/447 |
| 4,774,111 | 9/1988 | Lo | 427/387 |
| 4,783,552 | 11/1988 | Lo et al. | 560/198 |
| 5,036,117 | 7/1991 | Chung et al. | 522/172 |
| 5,506,289 | 4/1996 | McDermott et al. | 524/306 |
| 5,525,427 | 6/1996 | Griswold et al. | 428/447 |

FOREIGN PATENT DOCUMENTS

| | | |
|---|---|---|
| 0 717 057 A1 | 6/1996 | European Pat. Off. . |
| WO 97/19128 | 5/1997 | WIPO . |
| WO 97/19128A | 5/1997 | WIPO . |

OTHER PUBLICATIONS

Patent Abstracts of Japan Aug. 17, 1990.

*Primary Examiner*—D. S. Nakarani
*Attorney, Agent, or Firm*—Kenneth S. Wheelock; Michelle Bugbee

[57] ABSTRACT

The combination of an aqueous silicone release emulsion selected from the group of aqueous silicone emulsions consisting of condensation curable and addition curable silicone emulsions with an aqueous polyurethane emulsion creates a mixed release emulsion that cures to a linerless release coating which is printable when applied to a substrate such as paper.

14 Claims, No Drawings

PRINTABLE PAPER RELEASE COMPOSITIONS

FIELD OF THE INVENTION

The present invention relates to paper release silicone compositions which cure by addition cure, condensation cure or thermal cure which may be printed.

BACKGROUND OF THE INVENTION

Curable silicone compositions are applied to paper substrates to aid in the release of adhesive materials thereon. Laminates comprising a release paper coated with a pressure sensitive adhesive and a sheet material that can be a decorative lamina or label are used by stripping off the release liner which is discarded and affixing the lamina or label onto a surface.

Typically these release compositions cure by one of two mechanisms, thermal curing or photo-catalytic curing. Thermally curing paper release systems generally are comprised of the following alkenyl siloxane based compositions:

(A) a linear alkenyl substituted polysiloxane polymer that is the primary component or base polymer of the curable composition;

(B) an hydrosilylation addition cure catalyst, typically either a platinum or rhodium based catalyst;

(C) a cure inhibiting compound or mixtures thereof to increase the useful life of the coating bath; and (D) a hydride functional cross-linking silicone, typically a methyl hydrogen siloxane polymer, copolymer or oligomer.

While the general practice usually employs linear base polymers, (A), solventless, high solids content formulations have been described. As described in U.S. Pat. No. 4,448,815 ('815) a linear alkenyl siloxane base copolymer is a copolymer of:

(1) $R_c R_d^1 Si_{(4-c-d)/2}$       1)

where R is generally an alkyl radical, $R^1$ is a low molecular weight olefinic substituent such as vinyl or allyl, c has value from 0 to 2 and the average of value of the sum c+d is 0.8 to 3; and (2) $R_n SiO_{(4-n)/2}$      2)

where R is generally an alkyl radical and n has a value of 0.8 to 2.5. The preferred base copolymer of the '815 patent has the following linear structure:

$(H_2C=CH)R_2Si-O-(R_2Si-O-)_i-(RR^1Si-O-)_j-SiR_2(H_2C=CH)$ where the subscripts i and j are integers.

U.S. Pat. No. 4,774,111 ('111) describes a variation of the above linear copolymer where the R group in formula 2 is selected from alkyl and alkenyl radicals. The polymer of the '111 patent is defined as being substantially linear, i.e. having no more than a trace amount of T or Q groups. This substantially linear requirement for alkenyl functional heat curing silicone release compositions is repeated in U.S. Pat. Nos. 4,772,515; 4,783,552 and 5,036,117.

In contrast, the possibility of branched alkenyl polymers is admitted by the structural formulas recited in U.S. Pat. No. 4,057,596 ('596). In the '596 patent the composition comprises:

(A') a substantially linear vinyl chainstopped polymer;
(B') a linear methyl hydrogen polymer;
(C') a methyl vinyl polysiloxane having at least three vinyl groups per molecule;
(D') a methyl hydrogen polysiloxane having at least three hydride hydrogen atoms per molecule; and
(E') a platinum hydrosilylation catalyst.

Component (C') is described in the '596 patent as containing $(H_2C=CH)(CH_3)SiO_{2/2}$ ($D^{vi}$), $(H_2C=CH)(CH_3)_2SiO_{1/2}$ ($M^{vi}$), and $(H_2C=CH)SiO_{3/2}$ ($T^{vi}$), units either singly or in combination with $(CH_3)_2SiO_{2/2}$ (D), $(CH_3)_3SiO_{1/2}$ (M), and $(CH_3)SiO_{3/2}$ (T). The optional inclusion of vinyl substituted T units and methyl T units permits the composition of the '596 patent to possess branched structures.

U.S. Pat. No. 4,386,135 describes a terminally unsaturated silicone polymer having the formula $R_{4-a}Si((R_2SiO-)_b OSiR_2 R^2)_a$      3)

where a may be 2, 3, or 4. When a=4 the formula produces a Q resin. When a=3, a T structure results and the structure possesses only a single branch point. When a=2, the formula devolves to an alkenyl chain stopped linear polymer.

The alkenyl functional silicone polymer paper release compositions typically used fall into one of two categories:

1) a linear alkenyl chainstopped polymer:

$M^{vi}D_x M^{vi}$      4)

where $M^{vi}$ indicates an alkenyl chainstopping M group or 2) multi-functional alkenyl copolymers:

$M^{vi}D_x D^{vi}_y M^{vi}$      5)

where $D^{vi}$ indicates an alkenyl substituted D group. The alkenyl chain stopped polymers, $M^{vi}D_x M^{vi}$, generally cure faster than the multi-functional copolymers, $M^{vi}D_x D^{vi}_y M^{vi}$. As paper release composites are delaminated, the formulations based on the linear alkenyl chainstopped polymers show significant increases in the delamination force necessary as delamination speed increases. In contrast, while the multi-functional alkenyl polymers tend to have a slower curing speed the increase in delamination force with increasing delamination speed is not nearly as great proportionately.

An older technology for paper release, largely supplanted by the thermal curing alkenyl based compositions and radiation curable photo-catalytic or free radical acrylate or epoxy compositions is based on condensation curable systems. Such condensation curable systems utilize a silanol stopped siloxane in place of the alkenyl functional siloxane. Thus such compositions typically are composed of:

(A) a silanol stopped polysiloxane polymer that is the primary component or base polymer of the curable composition;

(B) a condensation cure catalyst, almost always a tin containing condensation cure catalyst;

(C) optionally a cure inhibiting compound or mixtures thereof to increase the useful life of the coating bath; and (D) a hydride functional cross-linking silicone, typically a methyl hydrogen siloxane polymer, copolymer or oligomer.

While the alkenyl based compositions may have the alkenyl functionality anywhere in the alkenyl siloxane, a significant disadvantage of the silanol based condensation curable release formulations has been that the polymer is almost always silanol stopped.

Either of these two formulations has generally been satisfactory from the standpoint of printing graphics or text on the substrate prior to coating with the releases formulation. These formulations have thus received wide application in the preparation of various types of labels. The surface coating, which provides the desired release characteristic, however, usually does not permit the subsequent application of additional graphics or text, i.e. it has not been generally possible to print additional text or graphics onto the surface of the release coated substrate. While most applications of this technology are not unduly limited by this consideration, the manufacture of single use security instruments such as linerless postage stamps can not be accomplished with the state of this technology because cancellation inks do not adhere to the surface. Thus the development of a printable release coating would enable extension of release coating technology to the preparation of postage stamps which could be manufactured in the same fashion as other labels but would accept cancellation inks. Further, the technology would enable overprinting of conventional labels with identifying data such as production number, date produced, and the like, which information must currently be printed underneath the release coating on the substrate. A printable release coating is a sought after improvement in release coating technology.

SUMMARY OF THE INVENTION

The present invention provides for a release coating obtained by curing a mixture comprising:
a) an aqueous curable silicone emulsion, and
b) an aqueous curable polyurethane emulsion
whereby said release coating is printable. Because the present invention provides for a release coating it also therefore provides for a laminate comprising a substrate and the release coating of the present invention wherein said release coating is obtained by curing a mixture of:
a) an aqueous curable silicone emulsion, and
b) an aqueous curable polyurethane emulsion
whereby said release coating is printable.

It is necessary that the polyurethane emulsion comprising the coating have a contact angle with ethylene glycol of 50° or less when it is cured. It is also necessary that on a cured basis the proportion of polyurethane be at least 50 weight percent or greater relative to the silicone which should be less than 50 weight percent.

DETAILED DESCRIPTION OF THE INVENTION

We now disclose that mixtures of two different types of emulsions one of which separately provides a release coating when combined provide a release coating wherein the abhesive outer surface of the coating will accept ink, i.e. the coating is printable. Such a mixture of emulsions comprises 1) an aqueous silicone emulsion and 2) an aqueous polyurethane emulsion.

In the cured emulsion mixture which results in a release coating, the fraction of the release coating derived from the silicone emulsion, emulsion (A), ranges from about 5 to about 70 weight percent, preferably from about 10 to about 60 weight percent, more preferably from about 15 to about 50 weight percent, and most preferably from about 20 to about 40 weight percent while the fraction of the emulsion derived from the polyurethane emulsion, emulsion (B), ranges from about 30 to about 95 weight percent, preferably from about 40 to about 90 weight percent, more preferably from about 50 to about 85 weight percent, and most preferably from about 60 to about 80 weight percent. The mixture of the two emulsions always totals 100 weight percent either on a wet or cured basis.

The silicone emulsion, emulsion (A), is selected from the group of silicone emulsions consisting of condensation cure emulsions and addition cure emulsions. The components of the curable silicone emulsion, comprise:

a) a curable organopolysiloxane composition which may be a mixture of organopolysiloxanes comprising:
  i) an organopolysiloxane having the formula:

$R_a R'_b SiO_{(4-a-b)/2}$, where R is a monovalent hydrocarbon radical having from one to forty carbon atoms and R' is selected from the group consisting of hydroxyl (OH) and two to forty carbon atom monovalent hydrocarbon radicals having at least one carbon-carbon double bond (hereafter alkenyl) where the subscripts a and b are numbers summing to a value between about 0.9 and about 2.7;
  ii) an organohydrogenpolysiloxane or mixture of organohydrogenpolysiloxanes having the formula:

$R_d H_c SiO_{(4-d-c)/2}$ where R is a monovalent hydrocarbon radical having from one to forty carbon atoms where the subscripts d and c are numbers summing to a value between about 0.9 and about 3.0 subject to the limitation that the organohydrogenpolysiloxane possess at least two hydride functionalities per molecule or that the mixture of organohydrogenpolysiloxanes possess on average at least two hydride functionalities per molecule;
  iii) a curing catalyst which is a tin condensation cure catalyst when R' is hydroxyl and which is a noble metal catalyst, i.e. selected from the group consisting of platinum, iridium, osmium, palladium, rhodium, ruthenium or a mixture thereof, when R' is alkenyl; and optionally
  iv) a cure inhibitor to prolong the useful life of the coating bath when the catalyst is a noble metal catalyst and R' is alkenyl;
b) an emulsifying agent selected from the group consisting of polyvinyl alcohol, non-ionic surfactants and mixtures thereof;
c) water; and
d) optionally additional reagents selected from the group consisting of wetting agents, biocides and coalescing agents.

The tin catalysts that are particularly preferred are selected from the group consisting of stannous octoate, dibutyl tin di-acetate, dibutyl tin di-laurate, dioctyl tin di-neodecanoate, dimethyl tin di-neodecanoate, dibutyl tin laurate acetate, tin acetylacetonate and mixtures thereof. The platinum group metal catalysts preferred for addition cure or hydrosilylation are those as taught in U.S. Pat. Nos. 3,159,601; 3,159,662; 3,419,593; 3,775,452; and 3,814,730.

When noble metal addition cure catalysts are employed it is frequently desirable to extend the life of the coating bath by the addition of reaction inhibiting compounds. These compounds are typically characterized as an organic compound possessing some type of unsaturation, e.g. unsaturated amides as taught in U.S. Pat. No. 4,337,332; acetylenic compounds as taught in U.S. Pat. Nos. 3,445,420 and 4,347,346; ethylenically unsaturated isocyanates as taught in U.S. Pat. No. 3,882,083; olefinic siloxanes as taught in U.S.

Pat. No. 3,989,667; unsaturated hydrocarbon di-esters as taught in U.S. Pat. Nos. 4,256,870; 4,476,166; and 4,562,096; acetylenic maleates and fumarates as taught in U.S. Pat. No. 5,506,289; and conjugated ene-ynes as taught in U.S. Pat. Nos. 4,465,818 and 4,472,563. Other compounds have also exhibited inhibiting effects upon noble metal addition cure catalysts, e.g. hydroperoxides as taught in U.S. Pat. No. 4,061,609; ketones as taught in U.S. Pat. No. 3,418,731; sulfoxides, amines, phosphines, phosphites, and nitriles as taught in U.S. Pat. No. 3,344,111, diaziridines as taught in U.S. Pat. No. 4,043,977; half-esters and half-amides as taught in U.S. Pat. No. 4,533,575 and various salts as taught in U.S. Pat. No. 3,461,185.

When the emulsifier used is poly(vinylaclcohol) it is preferred that the amount of unhydrolyzed vinyl acetate is in the range of 6 to 12% and more preferably in the range of 8–12%. The nonionic surfactants that function as emulsifiers in the compositions of the present invention are selected from the group consisting of polyols, polyethers and polyhalides. Preferred emulsifiers have the formula:

R'(OCH2CH2)$_e$OH where R" is selected from the group consisting of nonylphenyl, octylpenyl and monovalent hydrocarbon alkyl radicals having from about 13 to about 15 carbon atoms and e is a subscript that varies from about 4 to about 40. The most preferred emulsifiers are Triton X100™, Triton X405™, Tergitol 15-S-12™, and Tergitol 15-S-30™ all available from Union Carbide Corp. or Renex 36™ available from ICI.

Among the optional additional reagents are wetting agents which are typically emulsifiers or surfactants possessing a diminished or reduced hydrophilic character. Particularly preferred wetting agents are Triton X35™ and Triton X45™ available from Union Carbide Corp. A preferred biocide is 37 wt. % aqueous formaldehyde. Coalescing agents are glycols, such as ethylene glycol or polyhydric alcohols.

The preferred polyurethane components suitable for the aqueous polyurethane emulsion, emulsion (B), are the reaction products of the following components:

a) a polyisocyanate having at least two isocyanate (—NCO) functionalities per molecule. Suitable polyisocyanates include diisocyanate monomers, oligomers cited in the following. There are aliphatic polyisocyanates such as 1,6-hexamethylene diisocyanate (HMDI) and its isocyanurate-containing derivatives; cycloaliphatic polyisocyanates such as 4,4'-mthylene bis(cyclohexyl isocyanate) (H$_{12}$MDI), cyclohexane 1,4-diisocyanate and its isocyanurate derivatives; aromatic polyisocyanates such as 4,4'-diphenylmethane diisocyanate (MDI), xylyene diisocyanate (XDI), toluene diisocyanate (TDI), isophorone diisocyanate (IPDI), 1,5-naphthalene diisocyanate (NDI), 4,4',4"-triphenylmethane diisocyanate, and their isocyanurate-containing derivatives. Mixtures or the reaction products of polyisocyanates can be used. Polyisocyanates contain the reaction products of these diisocyanate including isocyanurate, urea, allophanate, biuret, carbodiimide, and uretonimine entities are also included.

b) a polyol having at least two hydroxy functionalities per molecule and a molecular weight ranging from 250 to 5000 g/mole. The polyol may be selected from those commonly found in polyurethane manufacturing. They include hydroxy-containing or terminated polyesters, polyethers, polycarbonates, polythioethers, polyolefins, and polyesteramides. Suitable polyester polyols include hydroxy-terminated reaction products of ethylene glycol, propylene glycol, diethylene glycol, neopentyl glycol, 1,4-butanediol, furan dimethanol, polyether diols, or mixtures thereof, with dicarboxylic acids or their ester-forming derivatives. Polyesters obtained by the polymerization of lactones, such as caprolactone may also be used.

Polyether polyols useful for the polyurethane reaction include products obtained by the polymerization of a cyclic oxide including ethylene oxide, propylene oxide or tetrahydrofuran, or mixtures thereof. Polyether polyols include polyoxypropylene (PPO) polyols, polyoxyethylene (PEO) polyols, poly(oxyethylene-co-oxypropylene) polyols, polyoxytetramethylene (PTMO) polyols.

Polycarbonate polyols useful for the polyurethane reaction include the products represented by the reaction products obtained by reacting diols such as 1,3-propanediol, 1,4-butanediol, 1,5-pentanediol, 1,6-hexanediol, diethylene glycol with diaryl carbonates such as diphenyl carbonate, or with phosgene, or with aliphatic carbonate, or with cycloaliphatic carbonate. Commercial polycarbonate diols include Duracarb 120 series aliphatic diols and Durocarb 140 series cylco aliphatic diols, both of PPG Industries.

c) a hydrophilic group containing compound containing either two isocyanate or isocyanate-reactive groups per molecule. The hydrophilic group may be of ionic, ionic precursor or nonionic type. The isocyanate-reactive group include those compounds containing active hydrogen such as diols, polyols, diamines, and polyamines.

The hydrophilic groups suitable for the preparation of the water-dispersible polyurethanes include anionic and cationic types. Anionic types include dihydroxy carboxylic acids such as alpha, alpha-dimethylolpropionic acid (DMPA), diamino carboxylic acids such as 1-carboxy, 1,5-diaminopentane, and 2-(aminoethyl) aminoethyl carboxylic acid; and sulfonate diamines. Anionic type of hydrophilic groups may be the ones that readily form the salts of sulpho, sulfate, thiosulphato, phospho, phosphono, phosphato, or carboxy groups. Examples for cationic type include tertiary amino groups or precursors which readily form salts such as quaternary ammonium, quaternary phosphonium or ternary sulphonium salt groups.

Specific examples of the compounds containing ionic precursor groups and two or more isocyanate-reactive groups include triethanolamine, N-methyldiethanolamine and their oxyalkylation and polyeserification products, trimethylolpropane monophosphate and monosulphate, bis-hydroxylmethyl-phosphonic acid, diaminocarboxylic acids including lysine, cystine, 3,5-diamino benzoic acid, 2,6-dihyroxybenzoic acid, and dihydroxyalkanoic acids including 2,2-dimethylolpropionic acid.

d) a neutralizing compound for the hydrophilic group in c). Diamine or triamine such as diethyl amine or triethylamine is effective in neutralizing carboxylic group and yields a neutralized anionic hydrophilic site on the polyurethane.

e) a chain extender that reacts with the excess or available isocyanate groups in the presence of aqueous medium and leads to a high molecular weight polyurethane aqueous dispersion.

Suitable chain extenders for the further polymerization in aqueous medium are well known in the art. Selected examples include ethylene diamine, diethylene triamine, trietheylene tetraamine, propylene diamine, butylene diamine, hexamethylene diamine, cyclohexylene diamine, piperazine, tolylene diamine, xylylene diamine and isophorone diamine.

The built-in hydrophilic groups provide an effective method of creating fine particle size and dispersion stability in water. To obtain a stable dispersion, a content of 0.5 to 5% by weight of hydrophilic groups in the polyurethane is preferred. Hydrophilic groups can be introduced into polyurethane by incorporating the hydrophilic group-bearing diols, diamines, or the combinations during the polymerization of polyurethane.

Preparations of water-dispersible polyurethane are well known in the art. In general, an isocyanate-terminated polyurethane prepolymer comprising the reaction product of component a, b, c and optionally d is made, either by a one-step reaction process or step-wise reaction mechanism. The amount of each component required is controlled so the ratio of isocyanate functionality in component a to the total of isocyanate-reactive groups in component b and c fall in the range of 1:1 to 1:5.

The aqueous dispersions of polyurethane can be prepared by dispersing the mixture product of water-dispersible, isocyanate-terminated polyurethane prepolymer and higher functionality polyisocyanates in an aqueous medium, and effecting chain extension with an active hydrogen-containing chain extender in component e).

Conversion of any ionic precursor groups, for example, carboxy groups, in the prepolymer to ionic (salt) groups may be effected before, simultaneously with, or after the addition of the prepolymer to water. The agent described in component d) can be ammonia or a tertiary amine such as triethylamine, triethanolamine or N-methylmorpholine.

The commercially available polyurethanes include but are not limited to Bayhydrol 110™, Bayhydrol 121™ and Bayhydrol 123™ from Miles Industrial Chemical Division of Bayer, Inc. and Cydrothane HP-5135™ from Cytex Industries Corp.

Polyurethane formulations are generally maintained as trade secrets by commercial manufacturers. Therefore while it is difficult to specify the precise compositions that will allow a printable release coating, it is possible to describe a phenomenological test that correlates well with printability of the silicone polyurethane mixture and thus distinguishes without undue experimentation between those mixtures of polyurethanes and silicones that will produce a printable release coating and those that do not. Such a test is to determine the contact angle for ethylene glycol on a cured polyurethane coating. Printable release coatings result for mixtures of the present invention when the contact angle for ethylene glycol is 50° or less, preferably 45° or less, more preferably 40° or less and most preferably 35° or less.

The mixed curable emulsions of the present invention are coated or deposited onto a substrate, usually paper, and cured thereby forming a laminate comprising the substrate and the printable release coating. A printable release coating is a release coating wherein the abhesive outer surface of the coating will accept ink. It is preferred that the surfaces of such a printable release coating provide a durable acceptance of the ink, i.e. the ink does not smudge. It should be noted that when the ink is deposited on the printable release laminate there are at least three lamina: 1) the substrate, 2) the printable release coating, and 3) the coating of ink which partially or entirely covers the release coating. The materials useful as the substrate layer and as the layer or layers in contact with the printable release coating are selected from the group consisting of cellulose based substrates such as paper, film based substrates such as polyolefin films, polyester films, polyamide films and polyurethane films, and cellulose based substrates that have been coated with film forming materials derived from polyolefins, polyesters, polyamides and polyurethanes.

All United States patents referenced herein are specifically herewith and hereby incorporated by reference. The following experimental demonstrations are to be taken as illustrations of the invention and are not to be construed in any manner as limiting the appended claims.

Experimental

The following condensation curable aqueous silicone emulsions were prepared having the following compositions as shown in Table 1.

TABLE 1

Condensation Curable Aqueous Silicone Emulsions

| Silicone Emulsion | C-1 | C-2 |
|---|---|---|
| Components (wt. %) | | |
| Polydimethylsiloxane di-ol, 2550–3570 cPs | 21.5 | 24.0 |
| Polydimethylsiloxane di-ol, 500–800 cPs | 21.5 | 24.0 |
| Polydimethylsiloxane di-ol, 25–40 cPs | 2.0 | 2.0 |
| Polymethylhydrogen-siloxane (1.6–1.8 wt. % hydride) | 1.2 | 1.2 |
| Polyvinyl alcohol (Air Products Airvol 540™) | 2.0 | 0.0 |
| Propylene glycol | 2.0 | 2.0 |
| 37 wt. % formaldehyde in water | 0.2 | 0.2 |
| Alkyloxypolyethylene-oxyethanol | 0.0 | 2.6 |
| Nonylphenoxypolyoxy-ethylene glycol | 0.0 | 1.4 |
| Octylphenoxypoly-ethoxyethanol | 0.0 | 0.15 |
| Water | 49.6 | 42.45 |

A tin catalyst emulsion consisting of 50.00 wt. % di-octyl tin di-neododecanoate, 1.25 wt. % polyvinyl alcohol (Air Products Airvol 540™), 0.25 wt. % sodium lauryl sulfate and 37.25 wt. % water was prepared (designated Sn-E-1 in the following tables). The emulsions C-1 and C-2 were prepared by mixing the siloxane fluids, surfactants and a portion of the water which was then colloid milled with the remaining water, propylene glycol and formaldehyde. The process of colloid milling consisted of preparing a pre-mix that was passed through a Gaullin colloid mill with a gap setting of about 5 mil followed by three passes through a Gaullin homogenizer at 8,000 psi.

The condensation curable aqueous silicone emulsions were then mixed with commercially available aqueous polyurethane emulsions having the amounts shown in Table 2. The emulsions were coated onto AV-100 glassine paper, cured and then tape was applied to the cured coating and aged at 70° C. for 20 hours. The tapes were delaminated from the coated paper at a speed of 400 inches per minute at a pull angle of 180° providing a release force measurement in g/in.

TABLE 2

Release Force of Cured Mixtures of Condensation Curable Silicone Emulsions and Polyurethane Emulsions

| Composition | I | II | III | IV | V | VI |
|---|---|---|---|---|---|---|
| Wt. % polyurethane, dry film basis | 30 | 40 | 50 | 60 | 70 | 80 |
| Polyurethane (Witcobond W-506) | 10 g | 10 g | 15 g | 15 g | 20 g | 20 g |
| C-1 | 20.6 g | 13.2 g | 13.2 g | 8.8 g | 7.6 g | 4.4 g |
| Water | 57.7 g | 42.9 g | 51.1 g | 42.3 g | 48.1 g | 41.7 g |
| Sn-E-1 | 3.1 g | 2.3 g | 2.8 g | 2.4 g | 2.8 g | 2.4 g |

TABLE 2-continued

Release Force of Cured Mixtures of Condensation Curable Silicone Emulsions and Polyurethane Emulsions

| Composition | I | II | III | IV | V | VI |
|---|---|---|---|---|---|---|
| Coat weight, lb./ream | 0.99 | 0.87 | 0.78 | 0.66 | 0.55 | 0.45 |
| Printable, Y/N | N | N | N | Y | Y | Y |
| Release Force, Flexacryl 1625™, g/in. | 31.5 | 44.7 | 57.5 | 75.1 | 198.8 | 483.3 |
| Release Force, TESA 7475 tape, g/in. | 80.8 | 77.1 | 105.6 | 117.4 | 162.3 | 273.8 |

Notes:
Laminates were prepared on Boise Cascade 72 lb./ream EM0189 paper
The results in Table 2 demonstrate that when the polyurethane content of the dry film is above 50 weight percent a printable release composition results.

It is to be noted that not all polyurethane emulsions when combined with a silicone emulsion form a printable release coating. The following table, Table 3 demonstrates significant performance differences between various commercially available polyurethane emulsions.

TABLE 3

Type of Polyurethane Emulsion Affects Printable Release

| Composition | VII | VIII | IX | X | XI |
|---|---|---|---|---|---|
| Polyurethane: | | | | | |
| Sancure 2026™ | 16.8 g | 0 | 0 | 0 | 0 |
| Sancure 2255™ | 0 | 13.8 g | 0 | 0 | 0 |
| Solucote 1090™ | 0 | 0 | 13.5 g | 0 | 0 |
| Witcobond W-290H™ | 0 | 0 | 0 | 10.9 g | 0 |
| Bayhydrol 140AQ™ | 0 | 0 | 0 | 0 | 16.8 g |
| Contact Angle of Polyurethane | 48 | 52 | 52 | 36 | 41 |
| C-1 | 10.0 g | 10.0 g | 10.0 g | 10.0 g | 10.0 g |
| Water | 48.0 g | 51.3 g | 51.5 g | 54.2 g | 48.0 g |
| Sn-E-1 | 2.7 g | 2.4 g | 2.4 g | 2.1 g | 2.7 g |
| Printable, Y/N | Y | N | N | Y | Y |
| Release Force, Flexacryl 1625™, g/in. | >500 g | 276.1 g | 184.3 g | >500 g | 474.5 g |
| Release Force, TESA 7475 tape, g/in. | 227.3 g | 146.3 g | 109.5 g | 176.8 g (zippy) | 156.2 g |
| Coat weight, lbs./ream | 0.49 | 0.48 | 0.43 | 0.42 | 0.46 |

The results in Table 4 suggest that the types of emulsifying agents used to make the silicone emulsion are somewhat independent of the emulsifying agent.

TABLE 4

Effect of variation in Emulsifying Agent in Release Emulsions

| Composition | XII | XIII | XIV | XV | XVI | XVII |
|---|---|---|---|---|---|---|
| Polyurethane: | | | | | | |
| Witcobond 506 | 20.0 g | 20.0 g | 0 | 0 | 0 | 0 |
| Witcobond 320 | 0 | 0 | 20.0 g | 20.0 g | 0 | 0 |
| Bayhydrol 1 140AQ | 0 | 0 | 0 | 0 | 20.0 g | 20.0 g |
| C-1 | 14.5 g | 0 | 14.5 | 0 | 14.5 | 0 |
| C-2 | 0 | 13.1 | 0 | 13.1 | 0 | 13.1 |
| Sn-E-1 | 3.4 g | 3.3 g | 3.4 g | 3.3 g | 3.4 g | 3.3 g |
| Water | 27.0 g | 28.4 g | 27.0 g | 28.4 g | 27.0 g | 28.4 g |
| Printable, Y/N | Y | Y | Y | Y | Y | Y |
| Release Force, TESA 7475 tape, g/in. | 230 G | lock-up | 210 g | 224 g | 192 g | 194 g |

Notes:
Laminates were prepared on Boise Cascade 72 lb./ream FM0189 paper
The following addition curable silicone emulsions were prepared as shown in Table 5.

The following addition curable silicone emulsions were prepared as shown in Table 5.

TABLE 5

Addition Curable Silicone Emulsions

| Emulsion | A-1 | A-2 |
|---|---|---|
| Component, wt. % | | |
| Vinyl stopped polydimethylsiloxane, 350 450 cstks. | 37.02 | 0.0 |
| Vinyl stopped polydimethylsiloxane, 15–30 cstks | 0.00 | 40.59 |
| Platinum catalyst | 0.00 | 1.50 |
| Di-silanol stopped polydimethylsiloxane, 25–40 cPs | 1.30 | 0.00 |
| Polymethylhydrogensiloxane (1.0–1.1 wt. % hydride) | 1.68 | 0.00 |
| 1-ethynyl-1-cyclohexanol | 0.09 | 0.00 |
| Polyvinylalcohol (Air Products Airvol 540™) | 2.00 | 2.00 |
| Propylene glycol | 2.00 | 2.00 |
| 37 wt. % formaldehyde in water | 0.20 | 0.20 |
| Octylphenoxypolyethoxyethanol | 0.15 | 0.00 |
| Water | 55.56 | 53.71 |

The emulsions described in table 5 were mixed with commercially available polyurethane emulsions as described in Table 6 and evaluated for release properties and whether or not the cured coating was printable. All of the formulations XVIII through XXV were printable although they produced release coatings of widely varying release force.

TABLE 6

Release Force of Cured Mixtures of Addition Curable Silicone Emulsions and Polyurethane Emulsions

| Composition | XVIII | XIX | XX | XXI | XXII | XXIII | XXIV | XXV |
|---|---|---|---|---|---|---|---|---|
| Polyurethane | | | | | | | | |
| NeoRez R972™ | 17.0 g | 20.0 g | 0 | 0 | 0 | 0 | 0 | 0 |
| NeoPac R-9000™ | 0 | 0 | 17.0 g | 20.0 g | 0 | 0 | 0 | 0 |
| Hybridur 560™ | 0 | 0 | 0 | 0 | 17.0 g | 20.0 g | 0 | 0 |
| Hybridur 570™ | 0 | 0 | 0 | 0 | 0 | 0 | 17.0 g | 20.0 g |
| A-1 | 10.0 g | 5.0 g | 10.0 g | 5.0 g | 10.0 g | 5.0 g | 10.0 g | 5.0 g |
| A-2 | 1.3 g | 1.3 g | 1.3 g | 1.3 g | 1.3 g | 1.3 g | 1.3 g | 1.3 g |
| Water | 47.2 g | 43.8 g | 47.2 g | 43.8 g | 47.2 g | 43.8 g | 47.2 g | 43.8 g |
| Release Force, TESA 4156 tape, g/in. | 35.0 | 174.0 | 39.2 | 164.7 | 109.7 | 268.0 | 99.8 | 272.6 |

Having described the invention that which is claimed is:

1. A printable release coating comprising, based on the total amount of cured coating:
    a) 5 to 50 weight percent of a silicone component wherein the silicone component is derived from an aqueous curable silicone emulsion, and
    b) 50 to 95 weight percent of a polyurethane component wherein the polyurethane component is derived from an aqueous curable polyurethane emulsion
wherein said coating is formed by curing a mixture of the silicone emulsion and the polyurethane emulsion, provided that the polyurethane emulsion when cured in the absence of the silicone emulsion, exhibits a contact angle of 50° or less with ethylene glycol.

2. The release coating of claim 1 wherein said aqueous curable silicone emulsion is selected from the group consisting of aqueous condensation curable silicone emulsions and aqueous addition curable silicone emulsions.

3. The release coating of claim 2 wherein the contact angle of said polyurethane emulsion when cured is 45° or less.

4. The release coating of claim 3 wherein the contact angle of said polyurethane emulsion when cured is 40° or less.

5. The release coating of claim 4 wherein said aqueous curable silicone emulsion is an aqueous condensation curable silicone emulsion.

6. The release coating of claim 4 wherein said aqueous curable silicone emulsion is an aqueous addition curable silicone emulsion.

7. A laminate comprising a substrate and a printable release coating wherein said release coating comprises, based on the total amount of cured coating:
    a) 5 to 50 weight percent of a silicone component wherein the silicone component is derived from an aqueous curable silicone emulsion, and
    b) 50 to 95 weight percent of a polyurethane component wherein the polyurethane component is derived from an aqueous curable polyurethane emulsion
wherein said coating is formed by curing a mixture of the silicone emulsion and the polyurethane emulsion, provided that the polyurethane emulsion when cured in the absence of the silicone emulsion, exhibits a contact angle of 50° or less with ethylene glycol.

8. The laminate of claim 7 wherein said substrate is selected from the group consisting of paper, polyolefin films, polyester films, polyamide films, polyurethane films and paper coated with film forming materials selected from the group consisting of polyolefins, polyesters, polyamides and polyurethanes.

9. The release coating of claim 8 wherein said aqueous curable silicone emulsion is selected from the group consisting of aqueous condensation curable silicone emulsions and aqueous addition curable silicone emulsions.

10. The release coating of claim 9 wherein the contact angle of said polyurethane emulsion when cured is 45° or less.

11. The release coating of claim 10 wherein the contact angle of said polyurethane emulsion when cured is 40° or less.

12. The laminate of claim 11 wherein said aqueous curable silicone emulsion is an aqueous condensation curable silicone emulsion.

13. The laminate of claim 11 wherein said aqueous curable silicone emulsion is an aqueous addition curable silicone emulsion.

14. A printable release coating consisting essentially of, based on the total amount of cured coating:
    a) 5 to 50 weight percent of a silicone component wherein the silicone component is derived from an aqueous curable silicone emulsion, and
    b) 50 to 95 weight percent of a polyurethane component wherein the polyurethane component is derived from an aqueous curable polyurethane emulsion
wherein said coating is formed by curing a mixture of the silicone emulsion and the polyurethane emulsion, provided that the polyurethane emulsion when cured exhibits a contact angle of 50° or less with ethylene glycol.

* * * * *